July 27, 1926.  
H. A. FOSTER  
FISHING GAME  
Filed Feb. 13, 1926  
1,594,164

Inventor  
HENRY A. FOSTER  
By M. Talbert Pick  
Attorney

Patented July 27, 1926.

1,594,164

UNITED STATES PATENT OFFICE.

HENRY A. FOSTER, OF DES MOINES, IOWA.

FISHING GAME.

Application filed February 13, 1926. Serial No. 88,131.

The principal object of this invention is to provide a new and novel game which is instructive and entertaining.

A further object is to provide a novel game device which will withstand hard usage.

More specifically the object of this invention is to provide a fishing game of chance, which is manually operated.

These and other objects will be apparent to those skilled in the art.

My invention consists in the construction, arrangement and combination of the various parts of the device, whereby the objects contemplated are attained as hereinafter more fully set forth, pointed out in my claims and illustrated in the drawings, in which—

Children are always attracted by pictures of living things and like to play at a game modeled from the sport or vocation of their parents. It is for these reasons that I have produced a fishing game.

Figure 1:
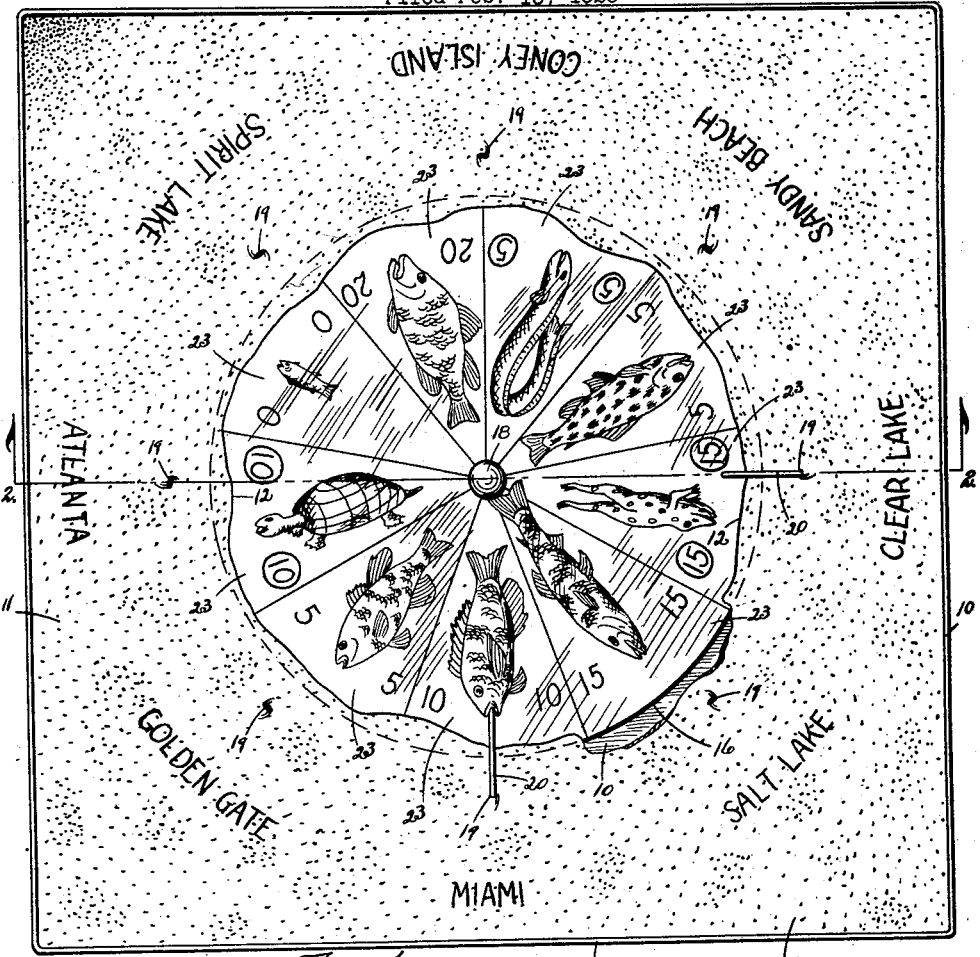
Fig. 1 is a top plan view of my device ready for use, with a section cut away to more fully illustrate the same.
Figure 2:
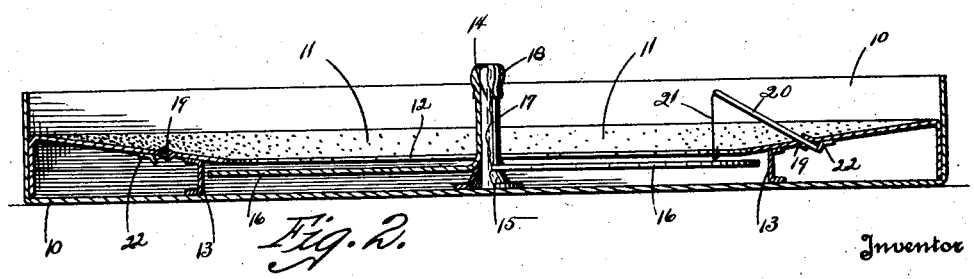
Fig. 2 is a side sectional view taken on line 2—2 of Fig. 1.

I have used the numeral 10 to designate a tray. Resting in this tray is the filler member 11 having a central opening 12. The marginal edge of this opening is irregular to imitate a shore line. To support the central portion of this filler member 11 is the circular supporting member 13 resting on the bottom of the tray. In the center of the tray and secured to the bottom thereof by suitable means is the upwardly extending rod 14. Around this rod and resting on the bottom of the tray is the cone-shaped supporting washer 15. The numeral 16 designates a plate having integrally formed at its center, a hollow stem 17. This stem is designed to embrace the rod 14 and the plate is designed to rest on the washer 15, as shown in Fig. 2. The plate is now capable of being spun by manually rotating the stem 17 with the thumb and fore finger. To facilitate the grasping of this stem for rotating the same, I have provided the knob 18 which is integrally formed on the stem. The numeral 19 designates a series of holes in the filler member, into any one of which may be placed the back end of a small fishing pole 20, having the line and hook 21. To prevent this pole from completely entering the hole it is placed in, a projection 22 is provided just back of each hole. As many fishing poles as there are players are used. In Fig. 1, I show two fishing poles. Back of each hole is printed the name of a famous fishing beach. The filler member may be decorated to portray these various beaches. The plate 16 is marked off in radially extending sections 23. Painted on these sections are representations of fish, frogs, turtles, and the like, and the value or minus value in pounds of each, as shown in Fig. 1.

The mouth of each character is so located on the plate that the same is capable of being adjacent the line and hook 21.

The practical operation of the device is as follows:

Each player takes a pole and line and selects the beach he desires to fish from. After the poles have been placed in their respective holes, the players alternately spin the plate and the number of pounds of fish they catch is determined by the value or minus value of the section of the plate adjacent their line and hook, each time the plate stops spinning. A score card of their catches is kept and the player that catches the most pounds of fish wins the game. If a player does not have good luck at one beach, he is at liberty to select another.

If it is desired, animals instead of fish and the like may be painted on the plate and the fishing poles replaced with small guns and an animal hunting game is obtained.

By having two plates, one with animals painted thereon, and one with fish and the like painted thereon, one may either fish or hunt merely by changing the plates.

Some changes may be made in construction and arrangement of my device without departing from the real spirit and purpose of my invention and it my intention to cover by my claims any modified forms of structure or use of mechanical equivalents which may be reasonably included within their scope.

I claim:—

1. In a device of the class described, a member having an opening, a plate rotatably mounted adjacent said opening, one or more miniature fishing poles and lines extending above the said plate, and marine characters painted on said plate.

2. In a device of the class described, a member having an opening, a plate rotatably mounted adjacent said opening, a handle on said plate for manually spinning the same, one or more fishing poles and lines detachably secured to the first mentioned member and extending over said plate, and marine characters painted on said plate.

3. In a device of the class described, a member having an opening, a plate rotatably mounted adjacent said opening, a means for manually spinning said plate, said first mentioned member having a series of holes, one or more fishing poles capable of engaging any one of said holes and to extend over said plate, marine characters painted on said plate and the score value of each.

4. In a device of the class described, a member having an opening, the names of various beaches printed around said opening, said member having a hole adjacent each name, a plate rotatably mounted back of said opening, a means of spinning said plate, one or more fishing poles each capable of engaging any one of said holes and extending over said plate, marine characters painted on said plate and the score value of each, for the purposes stated.

5. In a device of the class described, a tray, a filler member resting in said tray and having an opening, a circular supporting member for supporting the central portion of said filler member, an upwardly extending rod in the center of said tray, a plate rotatably mounted on said rod and adjacent the opening in said filler member, one or more fishing poles designed to extend over said plate, marine characters painted on said plate, and the score value of each character in pounds printed on said plate.

6. In a device of the class described, a tray, a filler member resting in said tray and having an opening near its center, an upwardly extending rod secured to the center of the bottom of said tray, a supporting washer embracing said rod and resting on the bottom of said tray, a plate journaled on said rod and engaging said washer, a stem on said plate for manually spinning the same, the names of various beaches printed on the filler member, a hole adjacent each name, one or more fishing poles capable of engaging any one of said holes and extending over said plate, radially extending sections marked on said plate and each having a marine character painted therein, and the score value of each section printed thereon.

HENRY A. FOSTER.